United States Patent [19]

Lamb

[11] 3,725,950

[45] Apr. 3, 1973

[54] ELECTROSTATIC PRINTING APPARATUS

[75] Inventor: Reginald T. Lamb, Mountain View, Calif.

[73] Assignee: Bausch & Lamb Incorporated, Rochester, N.Y.

[22] Filed: Nov. 17, 1969

[21] Appl. No.: 877,128

[52] U.S. Cl. ........346/74 ES, 117/17.5, 118/DIG. 23, 226/181, 242/55

[51] Int. Cl. ..........................G01d 15/06, G03g 15/10

[58] Field of Search ............346/74 ES, 74 E, 74 CH; 118/DIG. 23; 117/17.5, 37 LE

[56] References Cited

UNITED STATES PATENTS

| | | | |
|---|---|---|---|
| 2,955,894 | 10/1960 | Epstein | 346/74 ES |
| 2,892,709 | 6/1959 | Mayer | 346/74 ES |
| 3,540,412 | 11/1970 | Lloyd | 346/74 ES |
| 2,908,540 | 10/1959 | Bell et al. | 346/74 E |
| 2,792,780 | 5/1957 | Jacob | 346/74 ES |

*Primary Examiner*—Bernard Konick
*Assistant Examiner*—Gary M. Hoffman
*Attorney*—Robert W. Tuner, Esq. and Hyer, Eickenroht, Thompson and Turner

[57] ABSTRACT

A printing machine, of the kind in which data is printed on sheet material at a printing station by electrostatically charging selected areas of the sheet to attach pigmented particles to the selected areas, includes two rows of opposed and linearly aligned electrodes at the printing station. One row of electrodes is a row of stylus electrodes with the electrodes divided into groups having the same number of electrodes in each group. Each group is further divided into an odd block and an even block of electrodes with the same number of electrodes in each block. The other row of electrodes is a row of segment electrodes with each segment having a length equal to the length of one block of stylus electrodes. The row of segment electrodes is offset with respect to the stylus electrodes in a manner such that an even segment electrode and an odd segment electrode are associated in a pair with each block of stylus electrodes. Corresponding stylus electrodes in each group are connected together by a common supply line or highway. The voltage as supplied to either a stylus electrode or a segment electrode is insufficient by itself to produce a charge on the sheet; but when the voltage supplied to a stylus electrode is combined with the voltage supplied to an opposed segment electrode, a charge is produced on the sheet. This division of the voltage and this method of associating paired segments with each block of stylus electrodes are used to control the selective charging of areas of the sheet along the line of the opposed rows of electrodes.

18 Claims, 15 Drawing Figures

INVENTOR.
REGINALD T. LAMB
BY
Fryer, Tjensvold, Feix, Phillips & Lampio
ATTORNEYS INVENTOR.
REGINALD T. LAMB
BY
Fryer, Tjensvold, Feix, Phillips & Lempio
ATTORNEYS INVENTOR.
REGINALD T. LAMB
BY
Fraser, Tjensvold, Fein, Phillips & Lempio
ATTORNEYS INVENTOR
REGINALD T. LAMB
BY
Fryer, Tjensvold, Feix, Phillips & Lempio
ATTORNEYS INVENTOR
REGINALD T. LAMB
BY
Fryer, Tjensvold, Feix, Phillips & Lempio
ATTORNEYS INVENTOR.
REGINALD T. LAMB
BY
Fryer, Tjensvold, Feix, Phillips & Lempio
ATTORNEYS

INVENTOR.
REGINALD T. LAMB

BY
Fryer, Tjensvold, Feix, Phillips & Lempio
ATTORNEYS

ELECTROSTATIC PRINTING APPARATUS

This invention relates to a printing machine of the kind in which images are printed on sheet material by electrostatically charging selected areas of the sheet to attach pigmented particles to the selected areas.

This invention relates particularly to a printing machine of this kind in which the electrodes for producing the charge on the selected areas of the sheet are arranged in a line at a printing station. The sheet material is transported in strip form past the printing station. The image is progressively built-up by successive applications of voltage to the electrodes as the sheet is moved past the printing station.

Individual electrodes used in printing machines of this kind are quite small. The individual electrodes may have an area in contact with the paper which is 0.010 inch by 0.010 inch, or less.

By suitable control of the energization or firing of such electrodes, almost any pattern of surface image can be produced. Numbers, letters, graphs, charts, and drawings can be produced.

The number of electrodes required to produce images from such small areas and the complex wiring and control arrangements thought to be required in the prior art to produce the desired flexibility of operation of such machines has, in the past, resulted in bulky and expensive machines.

It is a primary object of the present invention to produce a quite compact and relatively inexpensive printing machine of this kind.

It is a related object to minimize the components required by making one component perform several functions.

In the printing machine of the present invention the electrodes at the printing station are arranged in two opposed rows. The voltage required to produce an electrostatic charge of sufficient magnitude on a selected area of the sheet is divided between opposed electrodes in the two rows.

This division of the voltage serves several purposes.

A relatively high voltage is required to produce a charge, and by dividing the voltage the transistors required to handle the voltage in each row of electrodes can have a lower voltage capacity than would be the case if the entire voltage were supplied by an electrode in one row alone. As a result, lower cost and more reliable transistors can be used.

Dividing the voltage has the advantage of being safer (since a relatively large total voltage is required) and dividing the voltage has the further advantage of permitting operation at higher altitudes without breakdown.

Dividing the voltage also serves a control function. As noted in the abstract above, the electrodes in one row, the stylus electrodes, are divided into groups and each group is further divided into blocks of stylus electrodes. Dividing the stylus electrodes into groups permits the entire set of stylus electrodes to be energized by a minimum of supply lines. The division of the voltage between the stylus electrodes and the segment electrodes also permit only the selected ones of the stylus electrodes in a block to print even though a plurality of stylus electrodes are energized (because of the parallel connection by the common supply line) each time a selected stylus electrode in any particular block in any particular group is energized. The way in which the segment electrodes are selectively energized in pairs and associated with the block of stylus electrodes produces this result.

The printing machine of the present invention has an inner storage compartment for storing a supply of the sheet material. A lid is pivotally mounted in the top of the printing machine to provide access to the storage compartment when the lid is open. A drive roller is mounted in the end of the lid. The segment row of electrodes is also mounted on the underside of the lid. By lifting up the lid the sheet can be led through the printing station and placed in position between the drive rollers without the need to thread the sheet through the rows of electrodes at the printing station or through the engaged drive roller.

When the lid is lowered back to its operative position, the drive rollers engage the paper and the rows of electrodes are aligned in opposition to produce the printing function. This structure and mode of operation is another specific object of the present invention.

The component parts of the printing machine are arranged around the storage compartment in a manner such that the overall width of the printing machine and the overall height of the printing machine are only slightly greater than the corresponding dimensions of the storage compartment. A printing machine having this arrangement of components is another specific object of the present invention.

The sheet material may be in roll form. In this event the printing machine of the present invention incorporates a linkage mechanism for lifting the roll of sheet material out of the storage compartment to a position where the roll is easily accessible when the lid is open. This linkage mechanism is a further specific object of the present invention.

Other and further objects of the present invention will be apparent from the following description and claims and are illustrated in the accompanying drawings which, by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

Figure 1:
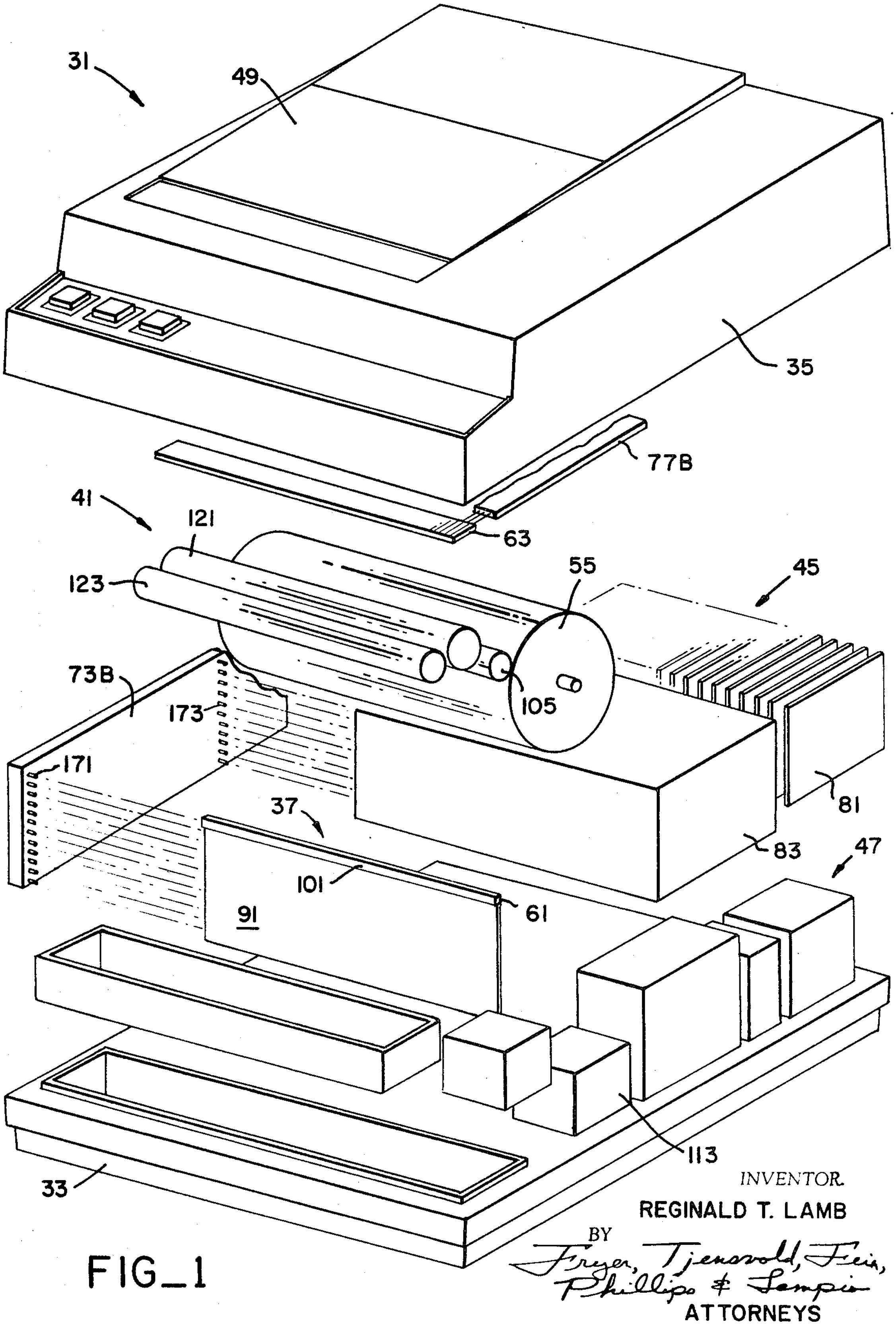
FIG. 1 is an exploded view of a printing machine constructed in accordance with one embodiment of the present invention and shows in diagrammatic form the principal operating components of the machine and the way in which the components are assembled in the machine.
Figure 15:
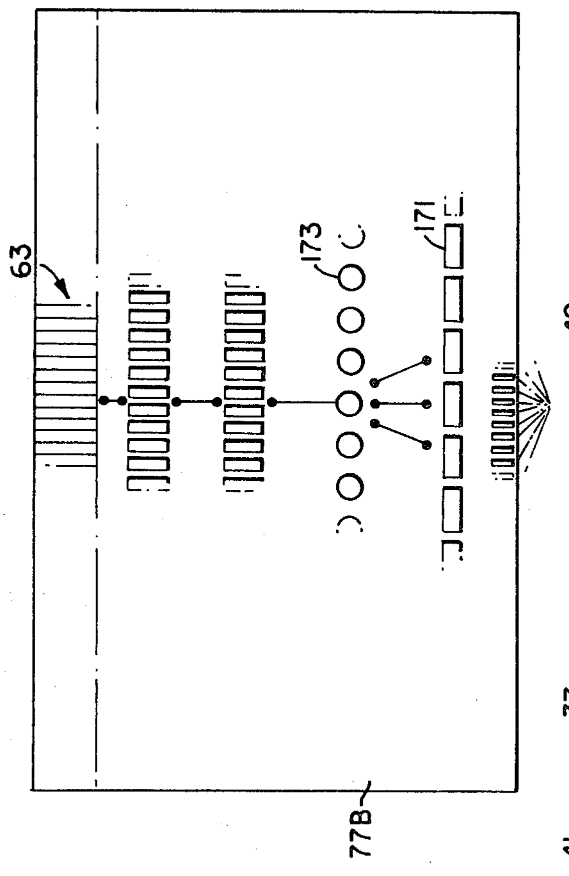
Figure 14:
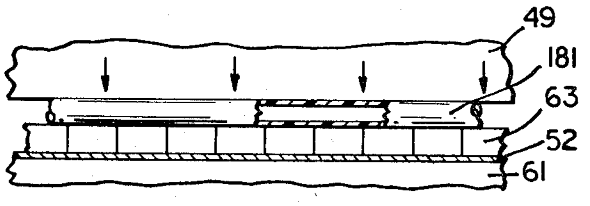

FIG. 14 is a fragmentary front elevation view showing how a fluid filled backup tube is used to press the segment electrodes downward into their desired operating positions; and FIG. 15 is a fragmentary view, somewhat diagrammatic in form, illustrating how the segment driver board of the machine shown in FIG. 1 contains part of the logic circuit to reduce the number of high voltage wires to the segment electrodes.

A printing machine constructed in accordance with one embodiment of the present invention is shown in exploded view in FIG. 1 and is indicated generally by the reference numeral 31.

The printing machine 31 includes a base frame 33 (which may be a casting) and a cover 35.

Figure 2:
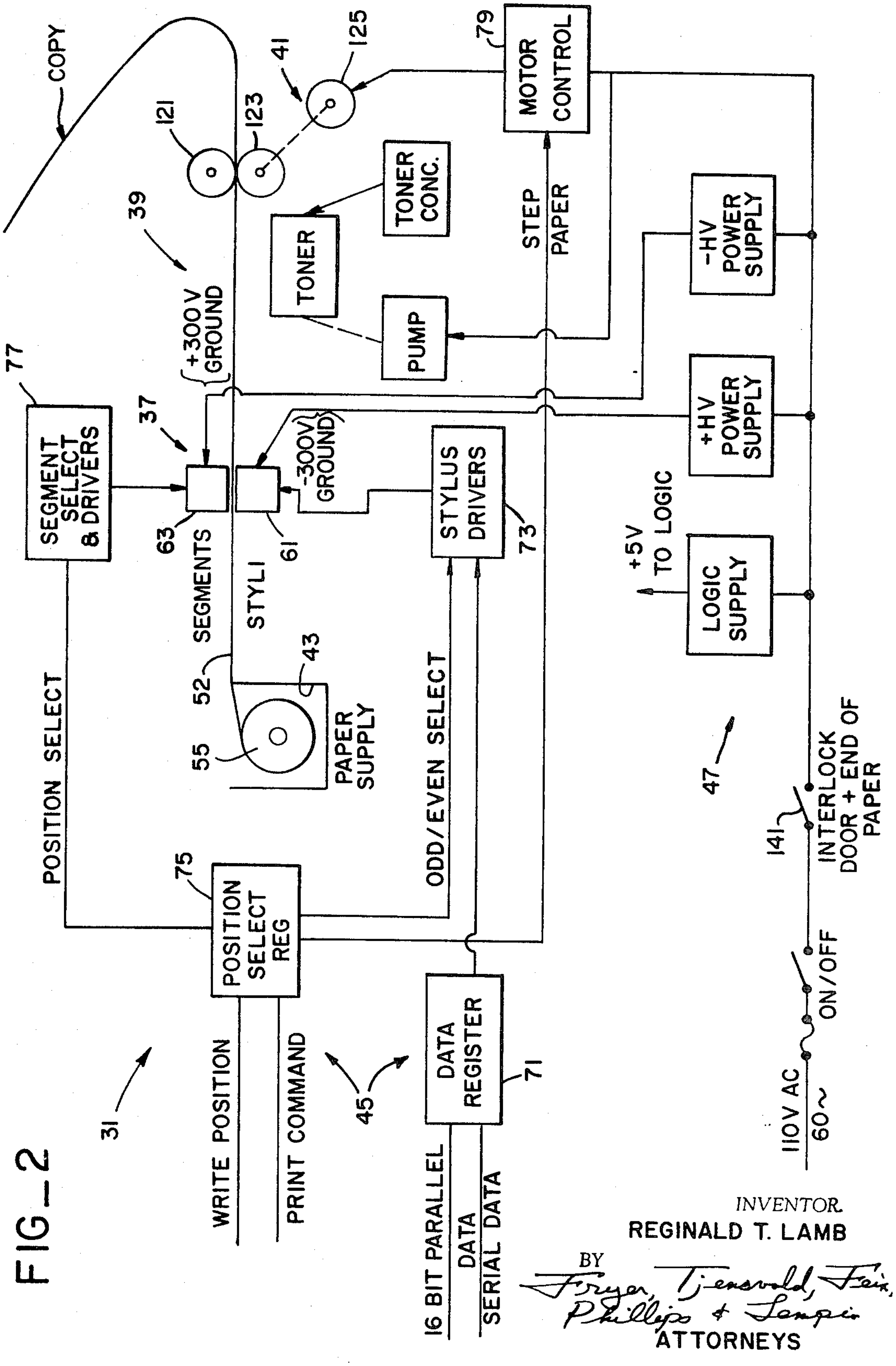
FIG. 2 is a block diagram showing in diagrammatic form the way in which the elements of the printing machine shown in FIG. 1 are operatively associated.
Figure 3:
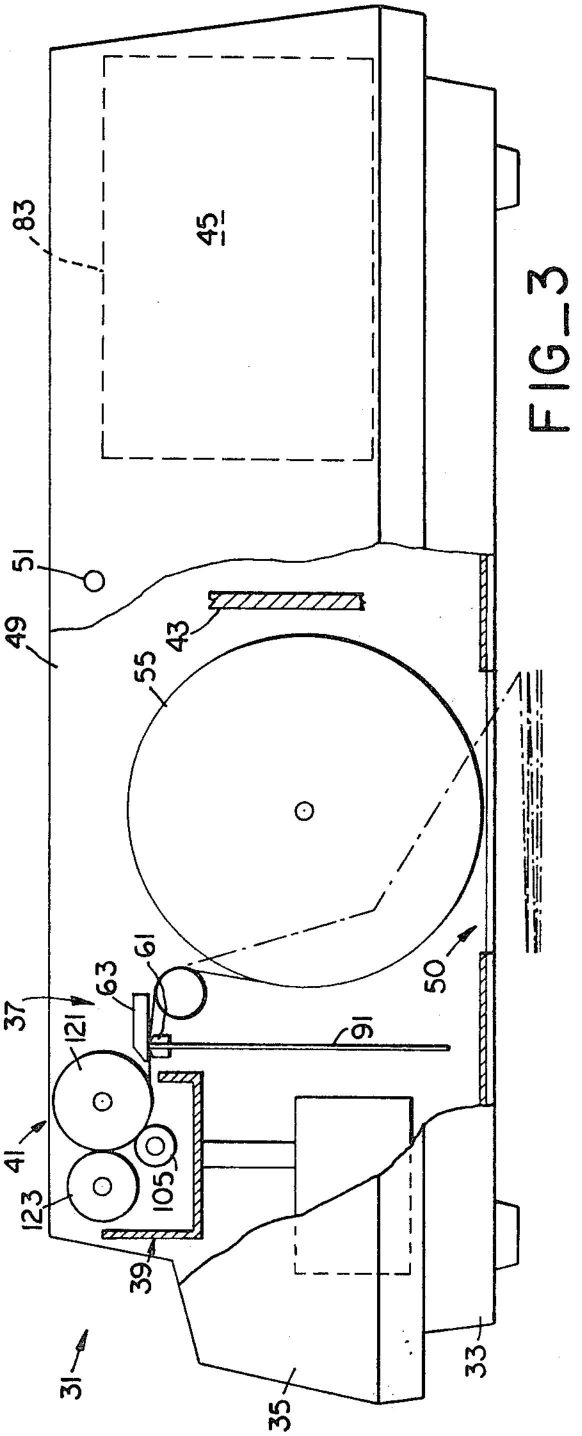
FIG. 3 is an end elevation view, partly broken away to show details of construction, of the printing machine shown in FIG. 1.

With reference to FIG. 2 and FIG. 3 as well as to FIG. 1, the printing machine includes a printing station 37, a toner station 39, and a drive means 41.

As best shown in FIG. 2 the printing machine 31 also includes a control means indicated generally by the reference numeral 45.

The power supply for the printing machine 31 is indicated generally by the reference numeral 47 in FIG. 2.

Figure 8:
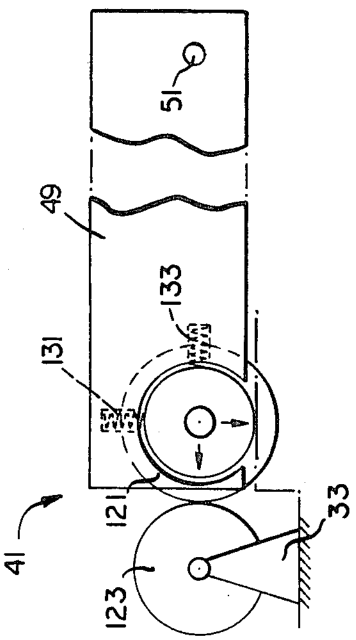
FIG. 8 is a side elevation view, partly broken away to show details of construction, and partly diagrammatic, illustrating a floating roller mounting and a kinematic mount for the roller in the lid of the printing machine shown in FIG. 1.
Figure 7:
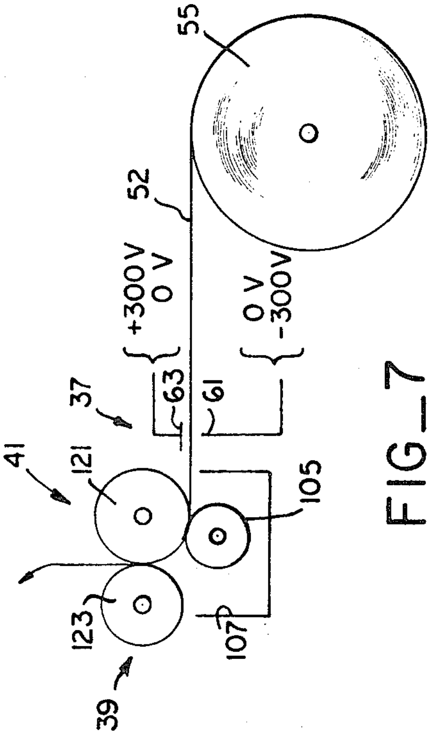
FIG. 7 is a diagrammatic view illustrating the way in which the total voltage for energizing the electrodes is divided between the stylus electrodes and the segment electrodes.

The top cover 35 includes a lid 49 (see FIG. 1) which is mounted for pivoting movement about its back edge about pivots 51 (see FIGS. 3 and 8). The lid 49, when opened, provides access to the storage compartment 43. Opening of the lid 49 also permits a sheet of material 52 (usually paper) on which the data is to be printed to be easily drawn through the printing stations 37 and the drive means 41 without the need to thread this sheet through these parts of the printing machine, as will be described in greater detail below.

The sheet material 52 is transported through the printing machine in strip form, and the material may be supplied by a roll 55 as illustrated in the drawings, or from a fan folded supply 50 of sheet material located below the storage compartment as shown in FIG. 3.

When the sheet 52 is paper the sheet may have a thin layer of dielectric material which receives an electrostatic charge at the printing station 37.

The electrostatic charge is produced on the sheet at the printing station by coaction between two rows of electrodes.

Figure 6:
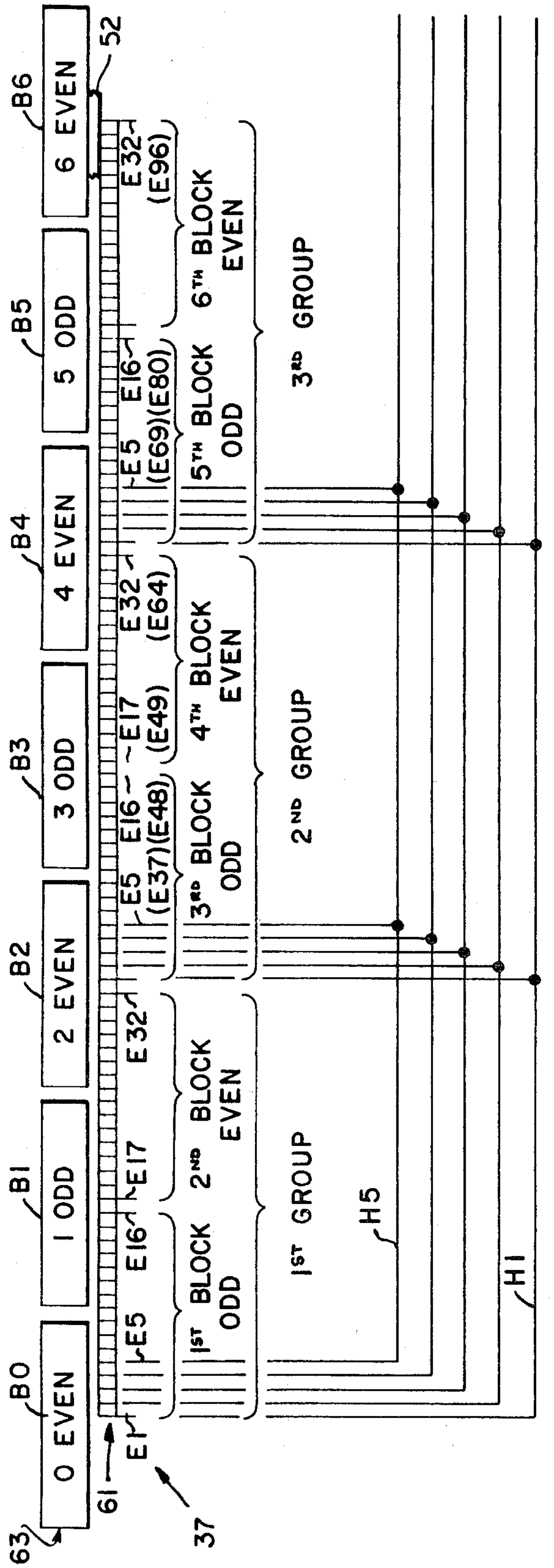
FIG. 6 is a front elevation view showing the manner in which stylus electrodes and segment electrodes are positioned with respect to one another.

As most clearly shown in FIG. 6 the printing station 37 has a lower row of stylus electrodes 61 and an upper row of segment electrodes 63. The individual stylus electrodes are indicated by the reference characters E1 through E96 in FIG. 6. These stylus electrodes are shown as lines for ease of illustration in FIG. 6 but actually have small rectangular areas at their upper ends presented to the underside of the sheet 52.

The area of an individual stylus electrode as presented to the paper may be 0.010 inch by 0.010 inch or less.

In a specific form of the printing machine of the present invention there are 1,024 of the stylus electrodes in the row 61 to cover 10.24 inches of a standard 11 inch wide recording sheet.

In accordance with the present invention, the stylus electrodes are divided into groups with the same number of electrodes in each group. Correspondingly numbered and located electrodes in each group are connected together by a common supply line. Thus, the first electrode E1 in each group is connected in parallel with the first electrode E1 in each other group by a common supply line or highway H1, and the fifth electrode E5 in each group is connected by a common supply line or highway H5. Highway H1 thus connects electrodes E1, E33, E65, and so on (counting the electrodes consecutively from the lefthand side as shown in FIG. 6) and highway H5 connects electrodes E5, E37, E69, and so on.

The row of stylus electrodes 61 also has each group further divided into an odd block and an even block as illustrated in FIG. 6 Each block has the same number of electrodes.

As will be described in greater detail below in the description of the operation of the printing machine, the control means 45 includes a register which loads one block at a time. The control means then fires that block after loading and while the data register for the next block is loading.

This manner of firing a block of stylus electrodes and also the manner in which the row 63 of segment or backup electrodes is associated with the blocks of stylus electrodes is effective to cause only the stylus electrodes to fire that are required for charging a selected area on the sheet, even though the common highway supplies voltage to a corresponding electrode in every group.

As also best shown in FIG. 6, the row of segment or backup electrodes 63 include individual segment electrodes B0, B1, B3, etc., aligned in an even, odd, even, odd, etc., manner as illustrated in FIG. 6.

Each segment electrode has a length equal to the length of a block of stylus electrodes.

The row 63 of segment electrodes is off-set as illustrated in FIG. 6 so that each block has two segment electrodes associated with that block. Thus, the first odd block of the first group of stylus electrodes has even segment electrode B0 and odd segment electrode B1 associated with that block. The even block of stylus electrodes of the first group has the first odd segment electrode B1 and the second even electrode B2 associated with that second block. The third odd block of stylus electrodes in the second group has the second even segment electrode B2 and the third odd segment electrode B3 associated with that third block.

A certain threshold voltage is required to produce a printable charge on the sheet. One type of coated paper can require a minimum charge of about 350 volts for the pigmented particles of the toner to be attached to the charged area of the paper. Any charge less than this would not be sufficient to pick-up a particle from the toner. Any charge greater than this would be sufficient to pick-up a particle from the toner.

In accordance with the present invention, the required total charging voltage is divided between the rows of electrodes, so that the voltage supplied to any individual stylus electrode is not by itself sufficient to produce a charge above the threshold level, but is sufficient to produce a charge on the paper when combined with the charge of an energized and opposed segment electrode. If the stylus electrodes were individually connected to the control means (rather than in parallel by the highways H as described above), it would be possible to energize the backup electrodes continuously at a set level and then to fire the individual stylus electrodes by selective energization of the stylus electrodes. However, with the parallel connections through the highways H, the firing of the stylus electrodes is controlled by selective energization of certain ones of the segment electrodes.

As shown in FIGS. 2 and 6, the stylus electrodes go from ground to about minus 300 volts when energized and the segment electrodes go from ground to about plus 300 volts when energized.

As also shown in FIG. 2, these voltages are supplied by the power supply means 47 including the positive high voltage power supply and the negative high voltage power supply.

In the operation of the printing station 37 as so far described, and with reference to FIGS. 2 and 6, the input data for the stylus electrodes is fed into a data register 71 of the control means 45 in either bit serial form, or 16 bit parallel form. The data register 71 receives the data for the first odd block of stylus electrodes until the register for that block is filled. At that time the information is fed in parallel by the data register to the stylus drivers 73, and the stylus drivers fire the first odd block of stylist electrodes in the first group in response to a signal from the position select register 75. This energizes the selected individual electrodes of the first odd block in the first group. Firing the stylus electrodes in parallel increases the speed by the order of magnitude of the stylus electrodes in parallel,e.g. 100 styli in parallel would give a 100 fold increase in speed over firing each electrode individually.

At this time the position select register 75 has also signaled the segment select and drivers 77 to fire the first even segment B0 and the first odd segment B1, so that the individual stylus electrodes energized in the first odd block of the first group are effective to produce the desired charge on the selected area of the sheet above the first odd block. At this time, no other segment electrodes are energized by the segment select 77. Even through individual electrodes in the other odd blocks of the other groups of stylus electrodes corresponding to the selected electrodes in the first odd block are also energized, none of these other stylus electrodes will be effective to produce a charge on the paper since none of the other opposed segments are energized.

While the first odd block is firing, the data register for the second even block is being filled up. After the first odd block has fired, and after the date register for the second even block has been filled, the position select register 75 signals the stylus drivers 73 to fire the second even block of stylus electrodes as selected by the information supplied from the data register 71, and the position select register 75 simultaneously signals the segment selection logic and drivers 77 to fire the first odd segment electrode B1 and the second even segment electrode B2 associated with the second block of stylus electrodes. As described above with reference to the first odd block of stylus electrodes, only the selected electrodes in the selected block are effective to produce an electrostatic charge on the sheet. While the second even block of stylus electrodes are firing, the data register for the third odd block of stylus electrodes in the second group is filling. After firing of the second even block is completed, the firing of the third block begins; and the filling of the data for the fourth even block also begins. On the firing of the third block of stylus electrodes, the second even segment electrode B2 and the third odd segment electrode B3 are energized by the segment select and driver 77. This process is repeated down the length of the two rows of electrodes until all of the stylus electrodes selected for producing a charge on the sheet have been fired.

After the firing of the roll of stylus electrodes has been completed, the position select register 75 signals the motor control 79 to step the sheet 52 one step in preparation for the next firing of the row of electrodes.

The data fed into the data register is supplied from a logic circuit which is energized at a relatively low voltage,e.g. plus 5 volts as illustrated in FIG. 2.

The logic circuit and the greater part of the control means 45 are contained on printed circuit cards 81 carried in a card cage 83 located behind the storage compartment 43 for the supply of sheet material (see FIG. 1 and FIG. 3).

Figure 4:
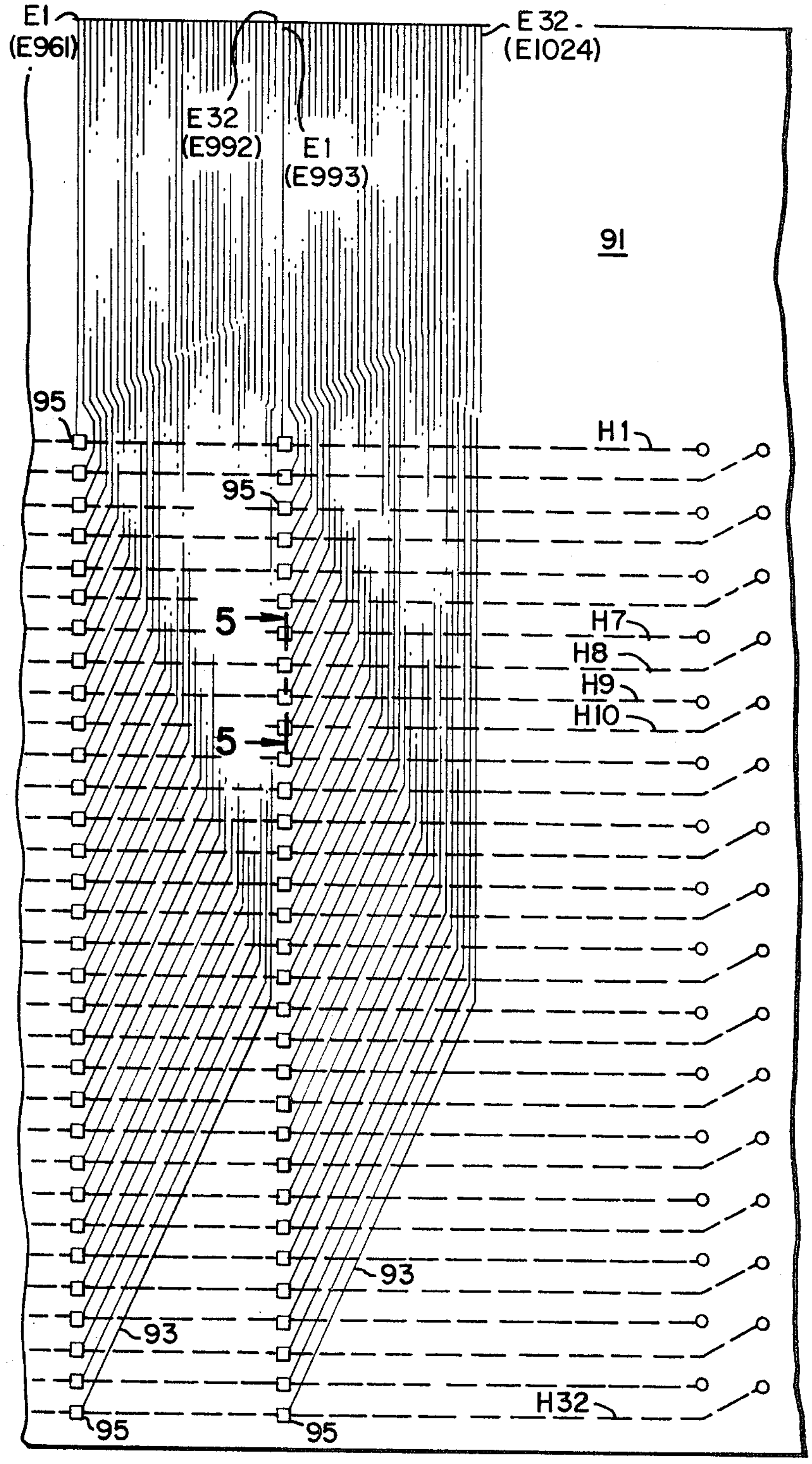
FIG. 4 is a front elevation view of a portion of a stylus board incorporated in the machine shown in FIG. 1 and illustrates how the styli are arranged in groups with corresponding styli in each group connected for energizing by a common electrical supply line.
Figure 5:
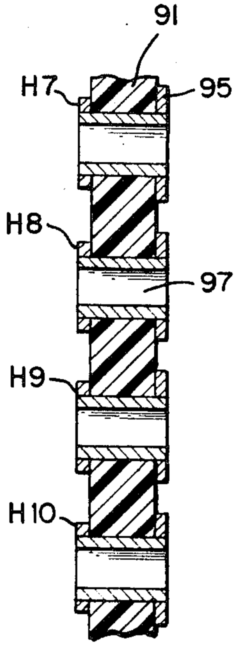
FIG. 5 is a cross-sectional view taken along the line and in the direction indicated by the arrows 5—5 in FIG. 4.

The stylus electrodes are mounted on one face of a stylus board 91. The stylus board is made of a dielectric material as shown in FIGS. 4 and 5. Each individual stylus electrode has a lead 93 connecting the electrode to a pad 95. The pads 95 are located directly opposite the common supply lines or highways H1 through H32 (see FIG. 4).

Each pad 95 is rectangular in shape, and has a sufficiently large area to permit a hole 97 to be drilled through the pad and through the board 91 and through the related highway on the opposite face of the board. The holes 97 are then coated with a conductive coating 98 so that there is an electrical connection between each highway and each pad opposed to that highway.

As illustrated in FIG. 4, the leads 93 extending from the individual styli to the pads 95 are angled to accommodate the width required by the pads, and the width of the first pad in particular.

The stylus leads and pads are produced on the board number 91 by a photo etching technique. The upper edge of the board 91 is capped or potted as indicated by the reference numeral 101 to protect the styli.

After the sheet 52 leaves the printing station 37, the sheet goes to the toner station 39.

Figure 11:
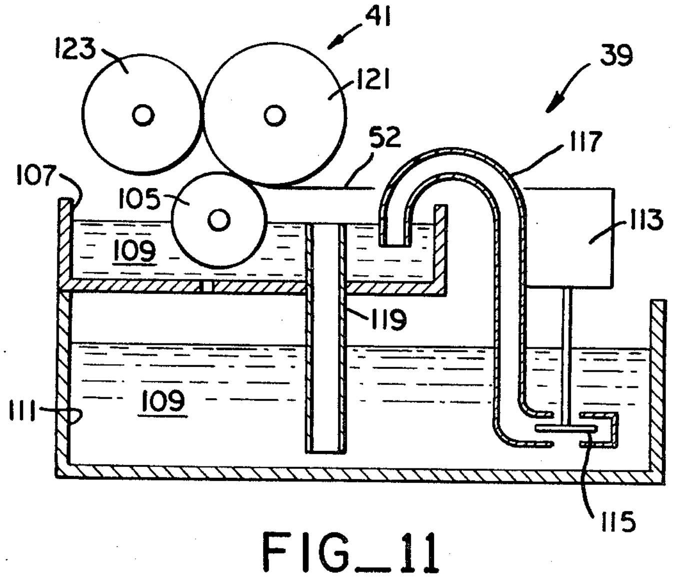
FIG. 11 is an end elevation view in cross-section of the toner trough and reservoir portions of the machine shown in FIG. 1 and illustrates the overflow and pump arrangement for the toner trough.

As best shown in FIG. 11, the toner station 39 includes a roller 105. The toner roller 105 is mounted for rotation in a toner trough 107 so as to pick-up toner from the trough and to apply that toner to the underside of sheet 52. The toner roller 105 is partly immersed in toner liquid 105 containing the pigmented particles, e.g. carbon particles in a colloidal suspension. The toner roller has a napped surface which distributes the particles evenly across the surface of the sheet 52 so that the particles can be attracted to the areas of the sheet having the electrostatic charges.

Figure 10:
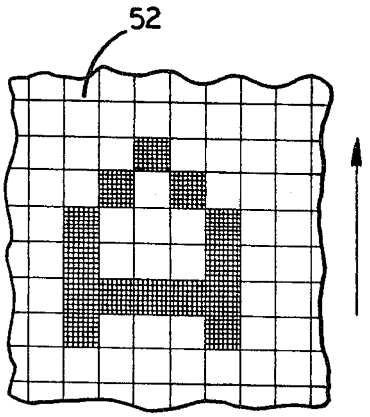
FIG. 10 is a plan view of a portion of a sheet on which an image is printed by the machine shown in FIG. 1 and illustrates the manner in which an image is developed by progressive movement of the sheet through the machine and between the rows of stylus and segment electrodes.

Thus, as best illustrated in FIG. 10, as the sheet 52 passes through the toner station 59 in the direction indicated by the arrow in FIG. 10, a predetermined image is reproduced as represented by the figure A in FIG. 10. The width of each individual block of the grid shown in FIG. 10 represents the width of an individual stylus electrode, and the length of the blocks of the grid represent the amount that the sheet is advanced on each advancement through the printing station.

It is a feature of the present invention that the toner station 39 is quite compactly arranged to minimize the space required for the toner step. The toner trough 107 is disposed vertically above a reservoir 111. The toner liquid is pumped from the reservoir by the pump 113 having an impeller 115 and through a tube 117. The level of the liquid in the trough 107 is maintained by a drain tube 119 having a open upper end and opening at its lower end directly into the reservoir 111. The lower end of the tube extends down below the level of the liquid in the reservoir and near the bottom of the reservoir to prevent dripping and noise and to minimize evaporation.

The drive means 41 for transporting the sheet 52 through the printing maching include a drive roller 121 and a squeegee roller 123.

The squeegee roller 123 is directly connected for drive by a motor 125 (FIG. 2). Alternatively, the squeegee roller may be driven by friction from the paper. The drive roller 121 and the toner roller are driven from the squeegee roller by gears. The force with which the squeegee roller and the driver roller 121 are engaged causes the drive roller to pull the sheet 52 through the printing machine by a winching action.

As best shown in FIG. 8, the driver roller 121 is mounted for rotation in the front end part of the lid 49. The drive roller 121 has a kinematic mount with two degrees of freedom. Springs 121 and 123 resiliently press the journal of the roller 121 both downwardly against a precision stop 120 and forward against the squeegee roller 123. The squeegee roller is mounted for rotation in a fixed position with respect to the frame 33.

The gear center to center distance is held by contact between the squeegee roller and the drive roller through the paper thickness. The relationship of the squeegee roller and the drive roller is held by roller contact and by the relationship of the squeegee bearings and the precision stop.

The spring 133 presses the drive roller 121 against the squeegee roller 123, and the spring 131 presses the roller journal down against an aligning pad (120 as shown in FIG. 8) so that the roller 121 is resiliently and accurately located in its operative position.

The row 63 of segment electrodes and the segment driver board 77 B are also attached to the underside of the lid 49. When the lid is lifted up to provide access to the storage compartment, the sheet 52 can easily be drawn over the roll of stylus electrodes 61 and over the squeegee roller 123. When the lid 49 is returned to its downward operating position, the sheet 52 is clamped between the rollers 121 and 123 and is pressed down against the row 61 of stylus electrodes by the row 63 of segment electrodes. It is not necessary to thread the sheet 52 between the rows of electrodes or between the rollers 121 and 123.

The squeegee roller, in addition to serving as part of the drive means, acts to bring excess toner liquid from the sheet 52.

Figures 12, 13:
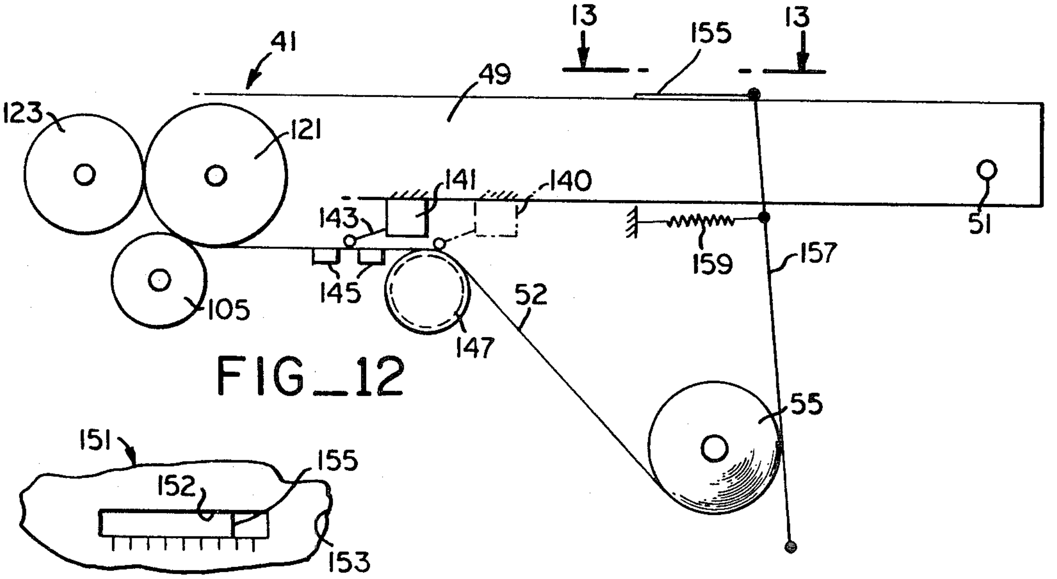
FIG. 12 is a fragmentary side elevation view illustrating the manner in which an interlock switch is mounted on the underside of the lid of the machine in FIG. 1 and associated with a bridge formed by the sheet being printed to provide both a high voltage shut-off function when the lid is open and a sheet run-out shut-off when the sheet material is used up.
FIG. 13 is a fragmentary plan view taken along the line and in the direction indicated by the arrows 13—13 in FIG. 12 showing how a sheet material indicator gauge is incorporated in the lid of the printing machine shown in FIG. 1.

As shown in FIG. 12, the printing machine of the present invention incorporates a switch 141 mounted on the underside of the lid 49 to do two functions.

The switch 141 serves as both an interlock with the lid 49 to cut off power to the machine when the lid is open and as a cut off switch for cutting off power when the printing machine runs out of the sheet 52.

As shown in FIG. 12, the switch 141 has a switch arm 143 which engages the upper surface of the sheet 52 in the closed and operative position of the door 49. The sheet 52 forms a bridge between a pair of spaced supports 145 or across a groove 138 in the idler roller 147 (see the alternate construction shown at 140 in FIG. 12) as long as there is a supply of the sheet material in the storage compartment. That is, the normal tension produced in the sheet by pulling the sheet over an idler roller 147 by the drive means 41 is sufficient to prevent the switch arm 143 from dropping between the supports 145. However, once the sheet runs out, the switch arm 143 does drop; and the switch opens to shut off power to the printing machine. Also, when the lid or cover 49 is opened, the switch arm 149 drops down to open the switch 141.

The roll 55 is contained within the printing machine, and is not visible when the lid 49 is closed.

An indicator 151 (see FIG. 13) is built into the top cover or lid 49. The indicator includes a gauge 153 and a window 152 with a movable pointer 155 to indicate the amount of sheet material remaining within the storage compartment.

As shown in FIG. 12, the pointer 155 is connected at the top end of a lever 157 which is pivotally connected at its lower end and resiliently held in engagement with the outer diameter of the roll 55 by a spring 159. As the diameter of the roll 55 decreases during the operation of the machine, the pointer 155 indicates the sheet material remaining in the storage compartment.

Figure 9:
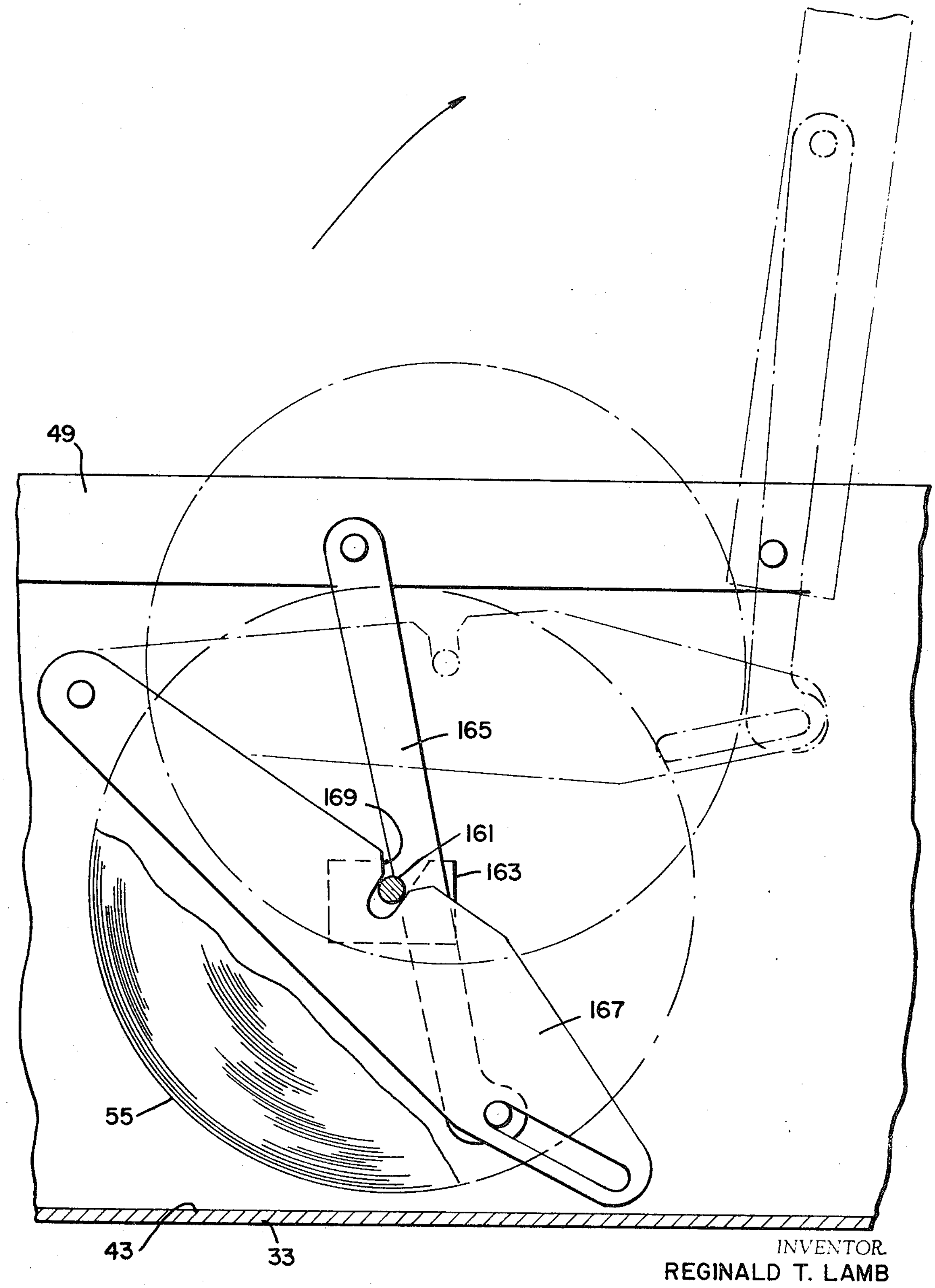
FIG. 9 is a fragmentary side elevation view of a linkage arrangement for lifting the paper roll of the machine shown in FIG. 1 upward to an easily accessible position when the lid of the printing machine is lifted.

FIG. 9 shows another feature of the resent invention. The shaft 161 of the roll 55 is supported in the slot of a fixed support 163 during normal operation of the printing machine. To permit ease of replacing the roll 55, a linkage mechanism is associated with the lid 49 so that the roll 55 is lifted part-way out of the storage compartment when the lid 49 is opened. This linkage mechanism includes a first link 165 pin jointed at one end to the lid 49 and connected in a pin and slot connection at its other end to a second link 167. The other end of the link 167 is pivotally connected to the machine frame 33. The link 167 includes a slot dimensioned and located to pick-up the shaft 163 as the lid 49 is moved to an open position. This raises the roll 55 to the position indicated by the phantom lines in FIG. 9 where the roll is easy to get at. The slot 169 and the connection of the link 165, 167 also returns the shaft 161 to a position where the shaft is supported by the permanent support 163 during normal operation of the machine.

As shown in FIG. 15 the segment driver board 77 B has part of the low voltage logic circuit mounted on the board in addition to the high voltage driver transistors. Thus, logic chips 171 are mounted on the segment driver board in addition to segment driver transistors 173.

There is a dual purpose in placing some of the logic on the segment driver board.

The chips 171 operate at a relatively low voltage, e.g. 5 volts, while the segment driver transistors 173 operate at a relatively high voltage, in the order of 300 volts as described above. The logic chips on the segment board thus act as a buffer. That is, in case of a burn-out of a segment driver transistor, the logic chip on the segment driver board will short out and the 300 volts will not go back to the rest of the logic circuit.

Placing some of the logic on the segment driver board also has the advantage of reducing the number of wires going to the segment driver board because of the fact that you are able to do some of the logic functions on the segment board. It also reduces high voltage leads in the flex harness to two leads.

As best shown in FIGS. 1 and 3, the overall height of the printing machine 31 and the overall width of the printing machine are just slightly greater than the corresponding dimensions of the storage compartment and the roll 55. The machine 31 is a very compact, desktop size printing machine. The internal space is very efficiently utilized. As described above, in many instances one component is made to perform several functions. The physical arrangement of the card cage 83 for the logic circuit, the storage compartment 43, the rows of electrodes, the roller arrangement and the toner system (going from the back of the machine to the front of the machine) results in a small overall length. The manner in which the power supply means 47 are arranged at the righthand side (including the power supply PS, the fan F, and the transformer T and the pump 113 and motor 125) utilizes this internal space of the machine quite effectively.

As a further example of the way in which almost every bit of space within the machine is utilized, the stylus drive board 73 B (having plug-in connecters 171 and 173 for connecting to the stylus board 91 and the logic circuit cards and card cage 81 and 83) is located on the left side of the storage compartment in what would otherwise be wasted space; and the segment driver board 77 B is located on the underside of the lid 49 in what would also otherwise be wasted space.

It is important that the row 63 of segment electrodes and that the row 61 of stylus electrodes remain in good contact with the sheet 52.

In accordance with the present invention, and as shown in FIG. 14, a tube 181 is located between the row 63 of segment electrodes and the lid 49. The tube 181 is filled with a fluid which serves to distribute the downward force of the lid 49 evenly across the row 63 of segment electrodes (by the hydrostatic action of the fluid within the tube 81) to insure that none of the segment electrodes move out of effective back-up relationship with the sheet 52.

The segments 63 may also be flexurally mounted. In this event loading is by weight.

While I have illustrated and described the preferred embodiments of my invention, it is to be understood that these are capable of variation and modification, and I therefore do not wish to be limited to the precise details set forth, but desire to avail myself of such changes and alterations as fall within the purview of the following claims.

In the claims:

1. A printing machine of the kind in which images are printed on sheet material at a printing station by electrostatically charging selected areas of the sheet at the printing station to attach pigmented particles to the electrostatically charged areas, and comprising, a first row of electrodes linearly aligned on one side of the sheet, a second row of electrodes linearly aligned on an opposite side of the sheet at the printing station, control means for supplying voltages to selected ones of the electrodes in the first and second rows to produce the electrostatic charge on the sheet including divider means for dividing the voltages between the two rows of electrodes in a manner such that a voltage supplied to any individual electrode in either the first or the second row is less than that required to produce the charge but is sufficient to produce the charge when added to the voltage on an opposed electrode in the opposite row, wherein the electrodes in the first row are stylus electrodes on a stylus board and are divided into groups having the same number of electrodes in each group and having correspondingly located and numbered electrodes in each group connected by a common supply line on the stylus board, each of the stylus electrode groups being further divided into two blocks with the first half of the electrodes in the group being located in an odd numbered block and the second half of the electrodes in the group being located in an even numbered block, and wherein the electrodes in the second row are segment electrodes with the length of each segment electrode being equal to the length along the stylus row of electrodes occupied by one block of the stylus electrodes, the row of segment electrodes being offset with respect to the stylus electrodes in a manner such that each block of stylus electrodes has one even numbered and one odd numbered segment electrode spanning the length of the block of stylus electrodes with one-half of the length of the even numbered segment electrode and one-half of the length of the odd numbered segment electrode extending beyond the ends of the block of stylus electrodes.

2. A printing machine as defined in claim 1 including control means for energizing both of the segment electrodes associated with a block of stylus electrodes when any stylus electrode in that block is selected for energization to print an area on the sheet opposite the stylus electrode.

3. A printing machine as defined in claim 2 including data register means connected to receive data for firing stylus electrodes in a block and associated with the control means to fire the stylus electrodes in that block after the data has been loaded in the register.

4. A printing machine as defined in claim 3 wherein the data register means are effective to start receiving data for the even block of stylus electrodes in a group after the data has been loaded in the register for the odd block and while the odd block of stylus electrodes is firing.

5. A printing machine as defined in claim 4 wherein the control means includes means for shifting energization of the segment electrodes from the first even numbered and first odd numbered segment electrodes to the first odd numbered and second even numbered segment electrodes as the firing of the first odd block of stylu electrodes is completed and as the firing of the second even block of stylus electrodes is to begin.

6. A printing machine as defined in claim 5 wherein the control means continue to shift the energization of the segment electrodes in pairs from adjacent even-odd to adjacent odd-even to adjacent even-odd to adjacent odd-even segment electrodes down the entire line of the segment electrodes in coordination with the firing of the related odd block of stylus electrodes, even block of stylus electrodes, odd block of stylus electrodes and even block of stylus electrodes until the entire line of stylus electrodes has been fired in blocks.

7. A printing machine of the kind in which data is printed on sheet material and comprising a printing station having electrodes which produce an electrostatic charge on certain areas of the sheet material at the printing station, a toner station at which pigmented particles are attached to the areas having the electrostatic charge to darken such areas and to thereby produce the printed image, said toner station being spaced from the printing station and located downstream of the printing station in the direction of movement of the sheet material, transport means including a drive roller for transporting the sheet material from the printing station to the toner station, and wherein said toner station comprises a toner trough at the toner station, supply means for supplying a liquid containing the pigmented particles to the trough, a toner roller associated with the drive roller and mounted to press against the sheet material on the drive roller and for rotation in a position in which the toner rollers picks up liquid from the trough and continuously applies the liquid to the surface of the sheet material as the sheet material is drawn between the drive roller and the toner roller and past the toner station, a reservoir, and drain means for regulating the level of the liquid in the toner trough and for returning excess liquid to the reservoir.

8. A printing machine as defined in claim 7 wherein the reservoir is located beneath the trough and wherein the supply means include a pump in a sump of the reservoir and a supply line running from the pump to the trough and wherein the drain includes a tube having an open upper end which establishes the level of the liquid in the trough and has a lower end which extends through the bottom of the trough and opens into the reservoir.

9. An electrode board for a printing machine of a kind in which data is printed on sheet material at a printing station by electrodes which are arranged in a line at the printing station and which are selectively energized to produce electrostatic charges on certain areas of the sheet material transported in a strip form through the printing station, said electrode board comprising, a board member of dielectric material, a plurality of parallel arranged and closely spaced electrical conductors mounted on one side of the board member and having end surfaces linearly disposed along one part of the board to provide closely spaced electrode elements for producing electrostatic charges on the sheet material passing over that part of the board member, said electrodes being divided into groups along the length of said part of the board member with the same number of electrodes in each group, a lead extending downward from said part of the board for each electrode, each lead for each electrode in any one group having a different length than any lead of any other electrode in that group whereby the leads terminate at different vertical distances from said part of the board, each lead for each corresponding electrode in each group having the same length whereby the leads for corresponding electrodes in each group terminate at the same vertical distance from said part of the board, supply lines corresponding in number to the number of electrodes in each group mounted on the opposite side of the board member with each supply line aligned with the ends of one set of leads terminating at a given distance from said part of the board, and connection means extending through the board member and providing an electrical connection between such supply lines and the ends of the leads whereby each electrode in each group is connected in parallel with the corresponding electrode in each other group by a common supply line on the other side of the board.

10. An electrode board as defined in claim 9 wherein the connecting means connecting the leads through the broad with the supply line on the other side of the board include holes drilled through the board member and electrically conductive coatings lining the holes.

11. An electrode board as defined in claim 9 wherein the supply lines terminate at one edge of the board and wherein plug-in connecters are attached to the ends of the supply lines at said edge of the board to permit the entire electrode board to be quickly plugged into a control circuit for controlling energization of electrodes in each of the groups.

12. An electrode board as defined in claim 10 wherein the lower ends of the leads include enlarged end portions through which the holes are drilled and wherein the leads are inclined at angles with respect to the electrodes to accommodate the enlarged areas of said end portions.

13. A printing machine of the kind in which images are printed on a sheet by electrostatically charging selected areas of the sheet to attach pigmented particles to the selected areas, said printer comprising, a storage compartment for storing a supply of the sheet material, electrode means located closely adjacent one end of the storage compartment for producing the electrostatic charge on the sheet as the sheet is moved past the electrode means, toner means located in front of and closely adjacent to the electrode means and including a toner roller for applying pigmented particles to the electrostatically charged areas of the sheet, drive means associated with the toner roller and including a drive roller and a squeegee roller which frictionally engage the sheet there between so that rotation of the drive roller and squeegee roller pulls the sheet from the storage compartment over the electrode means and through the toner means, said toner roller being mounted to press against the sheet material on the drive roller and a lid pivotally mounted above the storage compartment to provide access to the storage compartment.

14. A printing machine as defined in claim 13 wherein the electrode means comprise a lower row of linearly aligned electrodes and an upper row of electrodes and wherein the upper row of electrodes and one of said two additional rollers are mounted at the front edge of the lid so that the lid can be opened and the sheet of material drawn between the two rows of electrodes and between the drive rollers without having to thread the sheet of material between these components and the lid can then be lowered into position to place the drive rollers in operative position.

15. A printing machine as defined in claim 13 wherein the toner means include an upper toner trough and a lower reservoir and pump means for supplying a liquid containing the pigmented particles from the reservoir to the toner trough and drain means for regulating the level of the toner liquid in the trough.

16. A printing machine of the kind in which images are printed on a sheet by electrostatically charging selected areas of the sheet to attach pigmented particles to the selected areas, said printer comprising, a storage compartment in the central part of the machine for storing a supply of the sheet material, electrode means located closely adjacent one end of the storage compartment for producing the electrostatic charge on the sheet as the sheet is moved past the electrode means, toner means located in front of and closely adjacent to the electrode means and including a toner roller for applying pigmented particles to the electrostatically charged areas of the sheet, drive means associated with the toner roller and including a drive roller and a squeegee roller which frictionally engage the sheet therebetween so that rotation of the drive roller and squeegee rollers pulls the sheet from the storage compartment over the electrode means and through the toner means, a lid pivotally mounted above the storage compartment to provide access to the storage compartment, said printing machine including a card cage located behind the storage compartment and having height and width dimensions substantially the same as the corresponding dimensions of the storage compartment and logic cards in the card cage mounting electrical components for controlling the energization of the electrodes to produce selective charging of the areas of the sheet at the electrode means in response to signals supplied to the logic circuitry.

17. A printing machine as defined in claim 16 including electrical power components and mechanical drive components arranged along the length of the printing machine on one side and extending from the side of the toner means in the front of the machine to the side of card cage at the back of the printing machine whereby all the operating components of the printing machine are compactly contained within the machine and the overall height of the machine is just slightly greater than the depth of the storage compartment and the overall width of the printing machine is just slightly greater than width of the storage compartment.

18. A printing machine of the kind in which images are printed on a sheet by electrostatically charging selected areas of the sheet to attach pigmented particles to the selected areas, said printer comprising, a storage compartment in the central part of the machine for storing a supply of the sheet material, electrode means located closely adjacent one end of the storage compartment for producing the electrostatic charge on the sheet as the sheet is moved past the electrode means, toner means located in front of and closely adjacent to the electrode means and including a toner roller for applying pigmented particles to the electrostatically charged areas of the sheet, drive means associated with the toner roller and including a drive roller and a squeegee roller which frictionally engage the sheet therebetween so that rotation of the drive roller and squeegee rollers pulls the sheet from the storage compartment over the electrode means and through the toner means, a lid pivotally mounted above the storage compartment to provide access to the storage compartment, and wherein the electrode means comprise a lower row of linearly aligned electrodes and an upper row of electrodes and wherein the upper row of electrodes and one of said two additional rollers are mounted at the front edge of the lid so that the lid can be opened and the sheet of material drawn between the two rows of electrodes and between the drive rollers without having to thread the sheet of material between these components and the lid can then be lowered into position to place the drive rollers in operative position and wherein the lower row of electrodes is mounted on a generally rectangular shaped electrode board disposed vertically in front of the storage compartment and the upper row of electrodes is mounted on a generally rectangular shaped electrode board mounted flat against the underside of the lid and wherein the printing machine includes a generally rectangular shaped connector board disposed parallel to the inside wall of the printing machine on the side of the storage compartment opposite the side along which the power components are disposed and wherein said connector board connects terminals on the first electrode board to terminals on the card cage.

* * * * *

UNITED STATES PATENT OFFICE
CERTIFICATE OF CORRECTION

Patent No. 3,725,950 Dated April 3, 1973

Inventor(s) Reginald T. Lamb

It is certified that error appears in the above-identified patent and that said Letters Patent are hereby corrected as shown below:

Column 8, line 33, change "bring" to -- wring --

Signed and sealed this 12th day of February 1974.

(SEAL)
Attest:

EDWARD M. FLETCHER, JR.
Attesting Officer

C. MARSHALL DANN
Commissioner of Patents